(12) United States Patent
Bax et al.

(10) Patent No.: US 11,467,895 B2
(45) Date of Patent: Oct. 11, 2022

(54) CLASSIFIER VALIDATION

(71) Applicant: Oath Inc., New York, NY (US)

(72) Inventors: Eric Theodore Bax, Sierra Madre, CA (US); Natalie Bax, Sierra Madre, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 86 days.

(21) Appl. No.: 17/034,427

(22) Filed: Sep. 28, 2020

(65) Prior Publication Data

US 2022/0100593 A1    Mar. 31, 2022

(51) Int. Cl.
*G06F 16/30* (2019.01)
*G06F 11/07* (2006.01)
*G06F 16/28* (2019.01)
*G06N 20/00* (2019.01)

(52) U.S. Cl.
CPC ........ *G06F 11/076* (2013.01); *G06F 11/0727* (2013.01); *G06F 16/285* (2019.01); *G06N 20/00* (2019.01)

(58) Field of Classification Search
CPC ....... G06F 16/285; G06F 16/43; G06F 16/953
USPC ........ 707/609, 687, 705, 769, 790, 813, 821
See application file for complete search history.

(56) References Cited

U.S. PATENT DOCUMENTS

| 6,035,057 A | * | 3/2000 | Hoffman | G06K 9/6251 382/156 |
| 2004/0243328 A1 | * | 12/2004 | Rapp | A61B 5/4094 702/71 |
| 2014/0079197 A1 | * | 3/2014 | Hirschberg | H04L 51/08 379/88.14 |
| 2018/0089762 A1 | * | 3/2018 | López de Prado | G06N 5/003 |
| 2020/0184278 A1 | * | 6/2020 | Zadeh | G06K 9/6264 |

* cited by examiner

*Primary Examiner* — Sana A Al-Hashemi
(74) *Attorney, Agent, or Firm* — Cooper Legal Group LLC (57) ABSTRACT

One or more computing devices, systems, and/or methods for classifier validation are provided. A set of in-sample examples are partitioned into a reduced in-sample set and a remaining in-sample set. The reduced in-sample set is processed using a set of classifiers. A subset of classifiers are identified as having error counts, over the reduced in-sample set, below a threshold number of errors. A training procedure is executed to select a classifier having a minimum error rate over the set of in-sample examples. If the classifier is within the subset of classifiers, then an out-of-sample error bound is determined for the classifier.

20 Claims, 7 Drawing Sheets

CLASSIFIER VALIDATION

BACKGROUND

Classifiers are utilized to perform various types of tasks, such as identifying objects within images (e.g., identifying a bone fracture within an input image), determining whether a user will have an interest in certain content (e.g., an interest in a topic of a video, image, article, etc.), classifying emails as spam or not spam, etc. There is a vast number of different types of classifiers that can be utilized to perform tasks, such as neural networks, decision trees, k-nearest neighbors, logical regression, Naive Bayes, etc. In order to select a classifier to utilize for a task, a set of classifiers are trained using in-sample examples. An in-sample example comprises an input-output pair with an input (e.g., an image) and a known/correct output (e.g., the image depicts a bone fracture). Various types of selection procedures can be utilized for selection a classifier. A classifier may be selected based upon the classifier having a relatively low error rate over the in-sample examples. Validation can be performed to determine whether the classifier should be used outside of training on out-of-sample data. Validation of the classifier can be based upon a machine learning error bound corresponding to an out-of-sample error rate.

SUMMARY

In accordance with the present disclosure, one or more computing devices and/or methods for classifier validation are provided. In some embodiments of classifier validation, a set of in-sample examples are partitioned into a reduced in-sample set of examples and a remaining in-sample set of examples. The reduced in-sample set is processed using a set of classifiers. A sub-set of classifiers of the set of classifiers are identified as having error counts below a threshold number of errors over the reduced in-sample set. If the number of classifiers within the set of classifiers is below a threshold, then the set of classifiers is utilized to identify the sub-set of classifiers. Otherwise, if the number of classifiers exceeds the threshold, then merely a sampling of the set of classifiers is utilized to identify the sub-set of classifiers.

A training procedure is executed to select a classifier from the set of classifiers based upon the classifier having an error rate over the set of in-sample examples that is less than an error rate threshold (e.g., a minimum error rate compared to other classifiers). If the classifier is in the subset of classifiers, then an out-of-sample error bound is determined for the classifier. The out-of-sample error bound is determined based upon an error rate of the classifier over the remaining in-sample set, a count of remaining examples within the remaining in-sample set, and/or a ratio of a selected upper bound for a probability of bound failure and a number of classifiers in the subset of classifiers.

In some embodiments of classifier validation, a set of in-sample examples are partitioned into a reduced in-sample set of examples and a remaining in-sample set of examples. A determination is made as to an upper bound on a probability that a classifier drawn according to a distribution has an error count over the reduced in-sample set that is below a threshold number of errors. A training procedure is performed for weighted ensemble classifiers to select a posterior distribution over the set of classifiers using the set of in-sample examples. An out-of-sample error bound is computed based upon a divergence between the distribution and the posterior distribution. The out-of-sample error bound may also be computed by adding a natural logarithm of the upper bound as a shrinkage ratio (e.g., the shrinkage ratio corresponding to the probability that a classifier drawn according to the distribution has the error count over the reduced in-sample that is below a threshold number of errors set) to the divergence. The out-of-sample error bound may also be computed utilizing the remaining in-sample set as in-sample examples for computing the out-of-sample error bound. The out-of-sample error bound may also be computed by adding a fraction of the posterior distribution placed on classifiers that do not have error counts below the threshold number of errors to the out-of-sample error bound.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
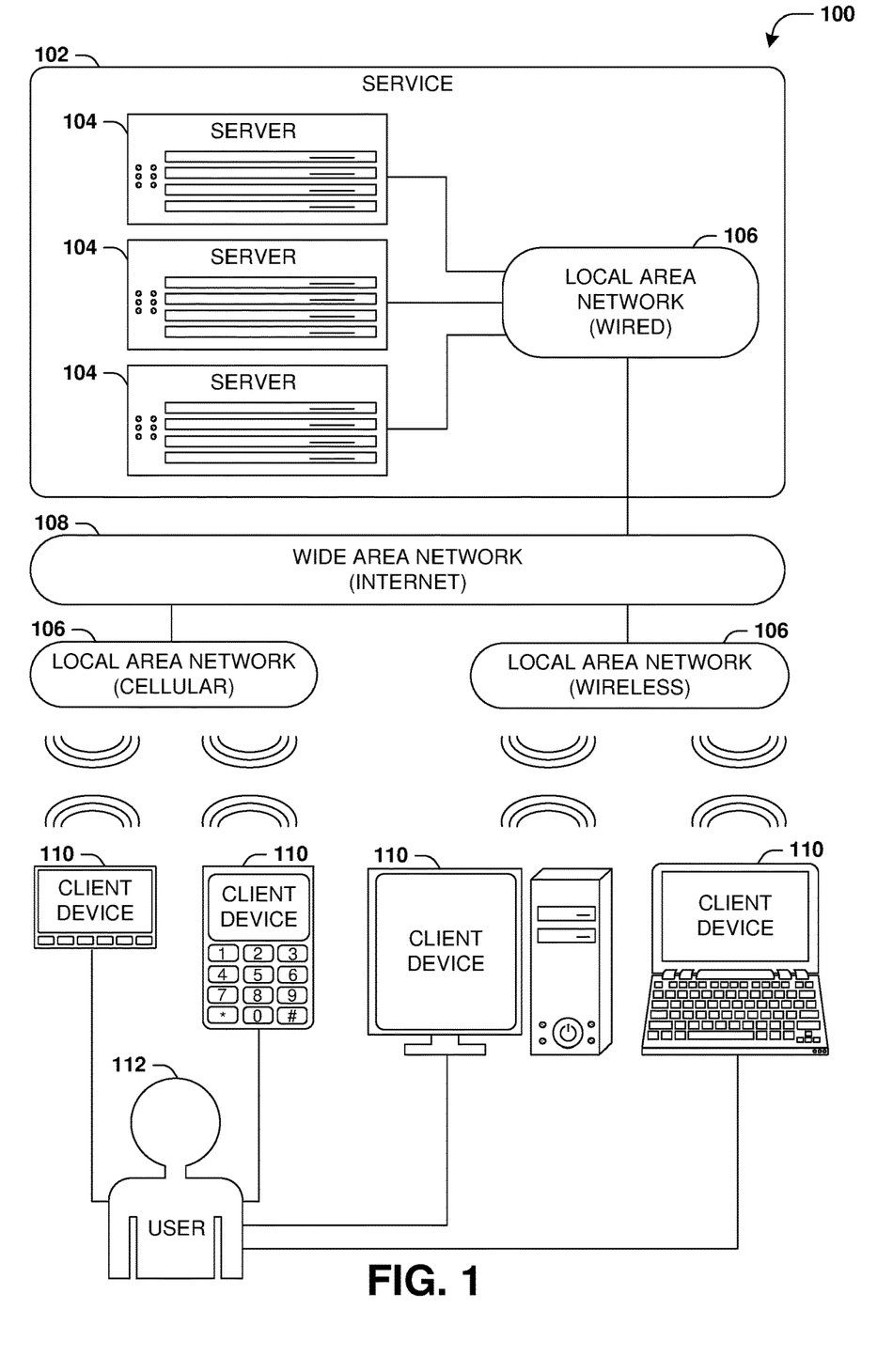
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ different architectures, may be compliant or compatible with differing protocols and/or may interoperate within the local area network 106. Additionally, a variety of local area networks 106 may be interconnected; e.g., a router may provide a link between otherwise separate and independent local area networks 106.

In scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
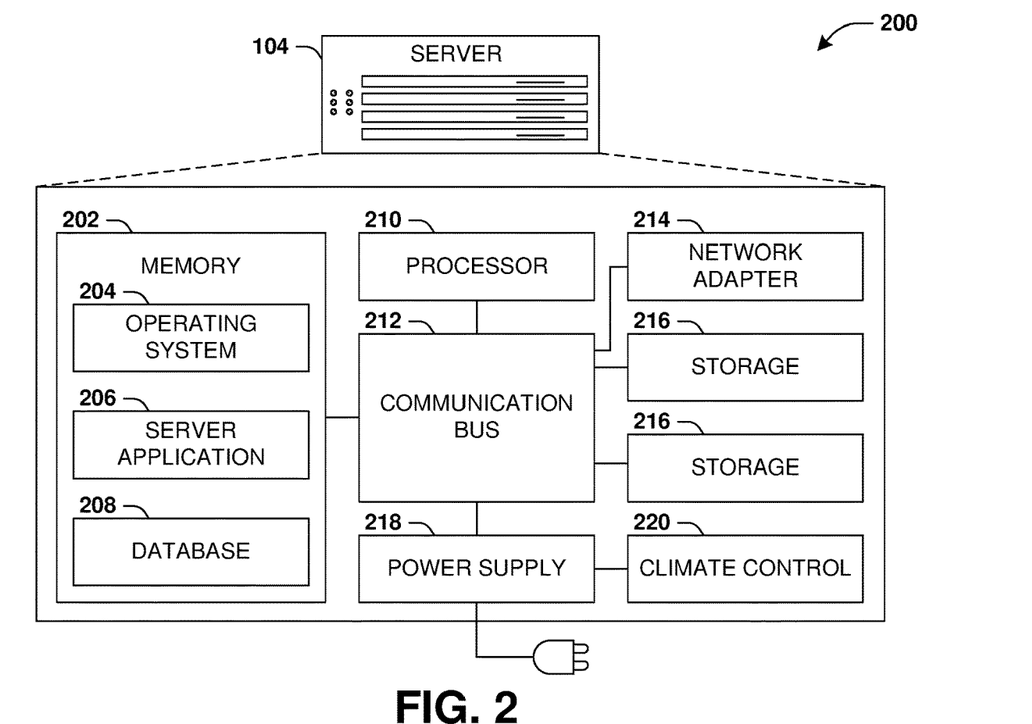
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic architecture diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow.

Many such servers 104 may be configured and/or adapted to utilize at least a portion of the techniques presented herein.

1.3. Client Device Configuration

Figure 3:
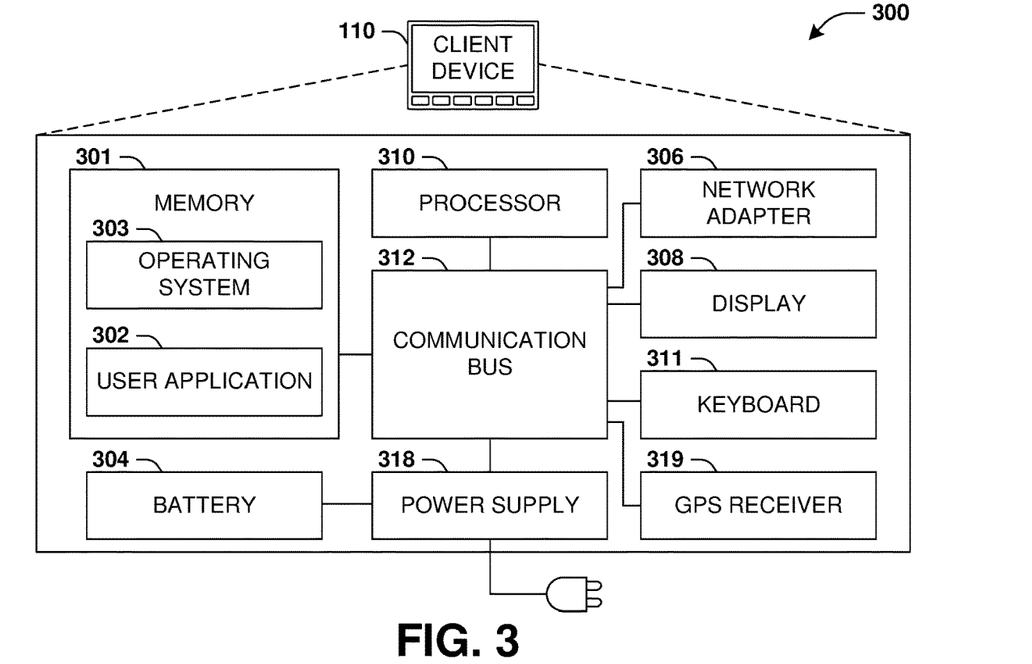
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

2. Presented Techniques

One or more systems and/or techniques for classifier validation are provided. In machine learning, a classifier is a function that takes an input and returns an output, such as a "yes" or a "no" output. For example, a classifier may be designed to take in an MRI image of a spine as input, and output whether the image shows a slipped disk as the output. In another example, a classifier may take interest categories of a website user as input, and output whether the website user will watch a video to the end if presented with the video on a web page. The output is may be referred to as a label or a decision. A classifier's error rate is a probability that the classifier is incorrect.

The process of training a classifier may involve starting with a set of classifiers, which may be referred to as a hypothesis set. Then, training data (also referred to as in-sample data), which is some labeled data consisting of input-output pairs (also referred to as examples), are used to select a classifier from the hypothesis set of classifiers. In an example, an input-output pair (an example) may comprise features of a user as input and an output as to whether the user viewed a particular video to the end. If a classifier outputs a different output than an output of the input-output pair based upon an input of the input-output pair, then the classifier was incorrect. The selected classifier may be referred to as a trained classifier. There are numerous selection procedures that can be used to select a classifier, which may be also referred to as training methods, algorithms, or procedures.

Selecting a classifier is usually not as simple as just going through all the hypothesis set of classifiers, evaluating their error rates over the training data, and selecting the classifier with a minimum error rate over the training data. This is because the hypothesis set of classifiers usually has too many classifiers for this simplified selection procedure to be practical. Alternatively, the training procedure may select a set of classifiers from the hypothesis set of classifiers and some weights for the classifiers, and thus the trained classifier is an ensemble classifier. One way to use an ensemble classifier is to select a classifier at random (e.g., according to the weights) for each input, apply that classifier to the input, and return that classifier's output.

A classifier's error rate over the training data is referred to as the training error rate or the in-sample error rate. The classifier's error rate over the distribution that generates inputs to which the classifier will be applied is referred to as the out-of-sample error rate or the test error rate. After training and before using the classifier, the in-sample error rate is now known. However, the out-of-sample error rate is not known because the in-sample data is known and accessible, but the distribution of the out-of-sample data is not known or available. Since the in-sample data was used to select the classifier, the in-sample error rate is usually lower than the out-of-sample error rate, in some examples.

The process of producing a bound on the out-of-sample error rate may be referred to as validation. Machine learning error bounds are often probably approximately correct (PAC) bounds. So, the machine learning error bounds are in the form of: "With probability at least 95%, the out-of-sample error rate is at most 10%." Thus, this machine learning error bound comes with a probability of being invalid, which is 5% in this example. That probability is usually labeled as delta. An error bound can be an upper bound on an error rate, a lower bound, or both, in which case it may be referred to as a two-sided bound.

Validation helps in the decision as to whether to use a trained classifier in practice (e.g., in a real-world application, such as for identifying objects within images) because validation provides a sense of how high the error rate may be in practice. If an error bound is low enough such as below a threshold, then the trained classifier may be used. If the error bound is not low enough such as above the threshold, then additional data may be obtained and use to train a new classifier. If additional data and training cannot be performed, then a plan for how to handle errors based on how often the errors are likely to occur may be devised and implemented.

In an example of a validation process, an in-sample data set with n input-output examples is obtained. A hypothesis set (H) with m classifiers is determined. The in-sample data set is used to select a hypothesis classifier (g) from the hypothesis set (H). The hypothesis classifier (g) may be selected based upon the hypothesis classifier (g) having a relatively lower in-sample error rate compared with other classifiers within the hypothesis set (H). The hypothesis classifier (g) and an out-of-sample error rate bound for the hypothesis classifier (g) may be returned. In an example, the out-of-sample error rate bound may be a function of a number of in-sample errors for the hypothesis classifier (g), the n input-output examples, and delta/m where m is the number of classifiers within the hypothesis set and delta is a probability of bound failure (e.g., if a bound is 95% sure that a classifier will be correct on out-of-sample data, then delta is a 5% probability that the classifier will be incorrect). An upper bound on the out-of-sample rate may be a function of k, the n input-output examples, and delta, where a rate k/n over n in-sample examples is given. Various such bounds may be used, such as Hoeffding, inverse binomial, McDiarmid, etc.

Methods, systems, and techniques for improved classifier validation are provided herein. These techniques provide more accurate and smaller error bounds so that more precise decisions can be made as to whether a classifier will have a low enough error rate on out-of-sample data (e.g., data being processed by the classifier during real-world application of the classifier, such as for determining whether a user will have interest in certain content, whether an image depicts a particular object, etc.) that the classifier can be used or whether additional training data (e.g., additional in-sample examples) are to be obtained for additional training. These techniques provide for more efficient classifier training, validation, and real-world implementation because relatively less computing resources are spent in obtaining training data and training classifiers in order to obtain the same level of assurance about the performance/accuracy of classifiers compared to prior validation techniques.

In an embodiment of classifier validation, as provided herein, an in-sample data set with n input-output examples is obtained. A hypothesis set (H) with m classifiers is determined. A number r of in-sample examples are removed from the in-sample data set, leaving n−r examples of in-sample data. A number $k^*\_r$ is determined, where (R) is a subset of classifiers in the hypothesis set (H) that have $k^*\_r$ or fewer errors over the r examples removed from the in-sample data. The number of classifiers in (R) is computed or bound. In particular, $m\_r$ is a count or bound on the number of classifiers in R. For a small hypothesis set (H) (e.g., a number of classifiers below a threshold), all classifiers are tested to see which classifiers have $k^*\_r$ or fewer errors over the r examples removed from the in-sample data. For a larger hypothesis set (H) (e.g., a number of classifiers above the threshold), a sampling of classifiers may be used in order to identify a fraction of the sample classifiers have $k^*\_r$ or fewer errors over the r examples removed from the in-sample data, and then that fraction is used to bound the rate of classifiers in hypothesis set (H) that have $k^*\_r$ or fewer errors over the r examples removed from the in-sample data.

The in-sample data set is used to select a hypothesis classifier (g) from the hypothesis set (H). The hypothesis classifier (g) may be selected based upon the hypothesis classifier (g) having a relatively lower in-sample error rate compared with other classifiers within the hypothesis set (H). The hypothesis classifier (g) and an out-of-sample error rate bound for the hypothesis classifier (g) may be returned. In an example, the out-of-sample error rate bound may be a function of a number of errors from the hypothesis classifier (g) over the n−r examples, a count of the n−r examples, and delta/$m\_r$. An upper bound on the out-of-sample rate may be a function of k, the n input-output examples, and delta. If the hypothesis classifier (g) has more than $k^*\_r$ errors over the r examples, then a failure message is returned that there has been a failure to produce an out-of-sample error bound for the hypothesis classifier (g).

In an embodiment of classifier validation, as provided herein, an in-sample data set with n input-output examples is obtained. A prior distribution (P) over a hypothesis set (H) of classifiers is determined. A number r of in-sample examples are removed from the in-sample data set, leaving n−r examples of in-sample data. A number $k^*\_r$ is determined, where $b\_r$ is defined as an upper bound on a probability that a classifier drawn according to the prior distribution (P) has $k^*\_r$ or fewer errors over the r examples removed from the in-sample data. A computation is performed to compute $b\_r$ by sampling classifiers according to the prior distribution (P). The probability $b\_r$ is a shrinkage ratio between an original hypothesis distribution of hypothesis classifiers and the restricted distribution of hypothesis classifiers.

The in-sample data is used to select a posterior distribution (Q) over hypotheses (e.g., classifiers). The distribution Q is similar to the hypothesis classifier (g) in the prior embodiment. The posterior distribution (Q) implies and ensemble classifier that selects a classifier according to the distribution Q for each example to be classified. The posterior distribution (Q) and an out-of-sample error bound for the posterior distribution (Q) is returned. The out-of-sample error bound may correspond to a PAC-Bayes bound, but using n−r in place of n and with $\ln(1/b\_r)$ subtracted from a Kullback-Leibler divergence between the posterior distribution (Q) and the prior distribution (P). If the posterior distribution (Q) places nonzero probability on a classifier with more than $k^*\_r$ errors over the r examples, then all such probability is added to the error bound.

Figure 4:
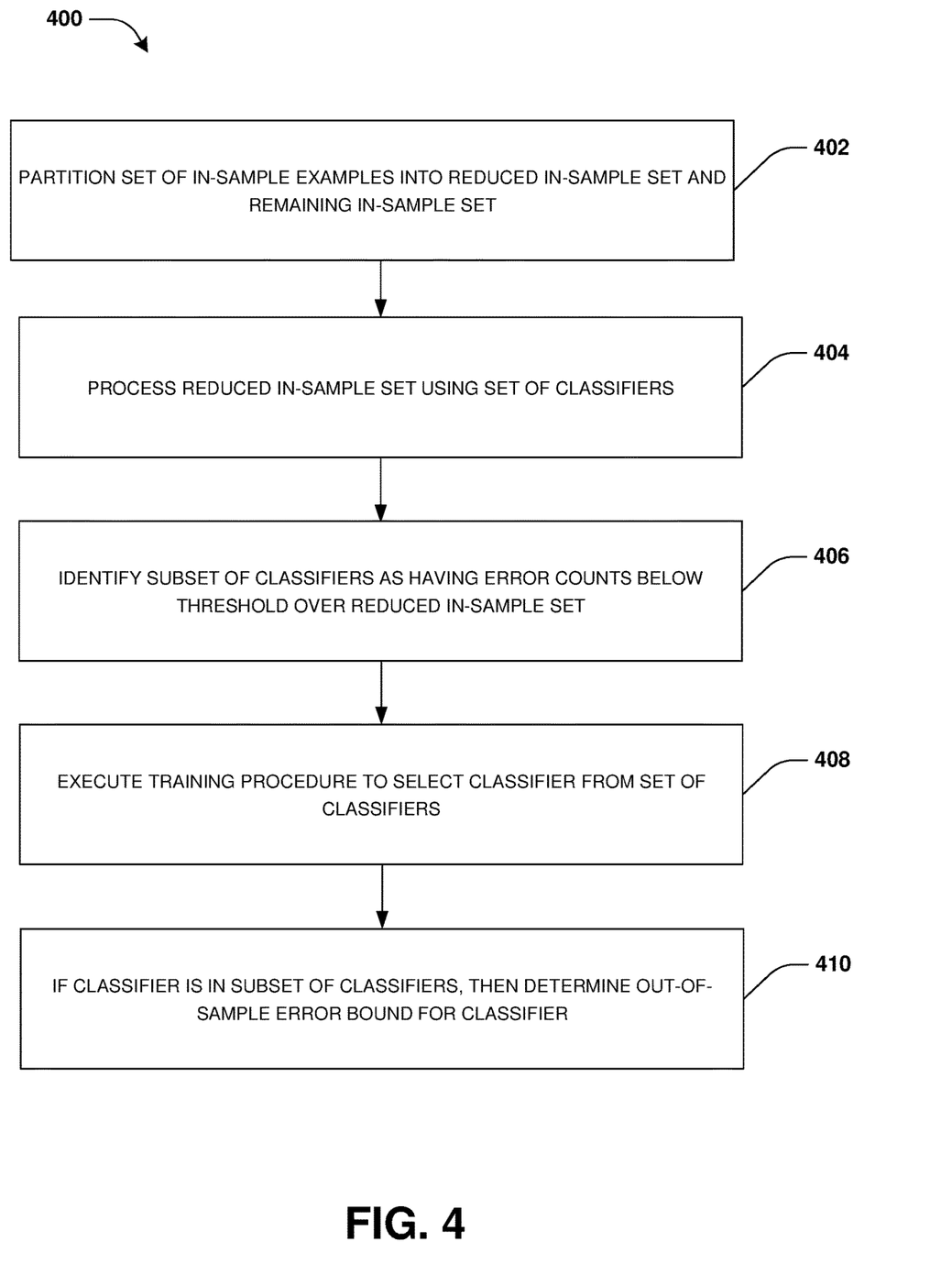
FIG. 4 is a flow chart illustrating an example method for classifier validation.

An embodiment of classifier validation is illustrated by an example method 400 of FIG. 4. A set of in-sample examples may be obtained for training and/or validating classifiers. In an example, n in-sample examples may be obtained as the set of in-sample examples. The set of in-sample examples may comprises input-output pairs. An input-output pair may specifying an input, such as a user trait, and an output that is known to be a correct output for the input, such as whether the user purchased a particular type of product. A set of classifiers may be identified, such as where m classifiers are selected as a hypothesis set (H) of classifiers for training and validation.

At 402, the set of in-sample examples are partitioned into a reduced in-sample set of examples and a remaining in-sample set of examples. In an example, r in-sample examples are removed from the set of in-sample examples, thus creating a remaining in-sample set of n−r examples and a reduced in-sample set of r examples.

A threshold number of error counts may be defined. In an example, the threshold number of error counts may be defined as $k^*\_r$. Accordingly, a subset of classifiers (R) of the classifiers within the hypothesis set (H) that have $k^*\_r$ or fewer errors over the reduced in-sample set of r examples may be defined.

At 404, the set of classifiers are invoked to process the reduced in-sample set of r examples in order to identify error counts of the classifiers over the reduced in-sample set of r examples. For example, an in-sample example within the in-sample set of r examples comprises an input-output pair. The input-output pair comprises an input, such as an age trait, a gender trait, a browsing history trait, a location trait, and/or other traits of a user. The input-output pair comprises an output, such as a determination that the user did not purchase a pair of running shoes. The input of the input-output pair of the in-sample example may be input into a classifier within the set of classifiers. If the classifier outputs that the user will not purchase the pair of running shoes, then the classifier output the correct output. If the classifier outputs that the user would purchase the pair of running shoes, then the classifier output the incorrect output. When the classifier outputs the incorrect output, the error count of the classifier is incremented. In this way, error counts of classifiers within the set of classifiers are determined based upon whether the classifiers output values for inputs of input-output pairs that match the outputs of the input-output pairs. At 406, the subset of classifiers of the set of classifiers are identified as having error counts below the threshold number of errors over the reduce in-sample set of r examples.

In an example of processing the reduced in-sample set of r examples in order to identify the subset of classifiers as having error counts below the threshold number of errors over the reduced in-sample set of r examples, the set of classifiers may be evaluated to determine whether a count of classifiers within the set of classifiers exceeds a threshold number of classifiers. The threshold number of classifiers may correspond to a practical number of classifiers to use for processing the reduced in-sample set of r examples without undue computing resource utilization and time consumption, such that if more than the threshold number of classifiers are used, then the processing of the in-sample set of r examples would take too long and/or consume too many resources.

If the count of classifiers within the set of classifiers does not exceed the threshold number of classifiers, then all classifiers within the set of classifiers are tested for identifying the set of classifiers having error counts below the threshold number of errors over the reduced in-sample set of r examples. If the count of classifiers within the set of classifiers exceeds the threshold number of classifiers, then a portion of the set of classifiers is sampled as a set of sampled classifiers for identifying the subset of classifiers. A fraction of the set of sampled classifiers that have error counts below the threshold number of errors over the reduced in-sample set of r examples are identified. The fraction of the set of sampled classifiers are utilized to bind a rate at which classifiers within the set of classifiers have error counts below the threshold number of errors over the reduced in-sample set of r examples. In this way, computer processing resources and time can be saved and more efficiently utilized by sampling a portion of the set of classifiers for identifying the subset of classifiers having error counts below the threshold number of errors over the reduced in-sample set of r examples, as opposed to utilizing al classifiers within the set of classifiers.

At 408, a training procedure is executed during a classifier training phase to select a classifier from the set of classifiers based upon the classifier having an error rate, over the set of in-sample examples, that is less than an error rate threshold (e.g., a minimum error rate in comparison with other classifiers evaluated by the training procedure using the set of in-sample examples).

At 410, a determination is made as to whether the classifier selected by the training procedure is within the subset of classifiers. If the classifier is within the subset of classifiers, then an out-of-sample error bound for the classifier is determined based upon an error rate of the classifier over the remaining in-sample set of examples. In an example, the out-of-sample error bound may also be determined based upon a count of the remaining examples within the remaining in-sample set. In an example, the out-of-sample error bound may also be determined based upon a ratio of a selected upper bound for a probability of bound failure and a number of classifiers in the subset of classifiers. The out-of-sample error bound may correspond to a probability of the classifier being incorrect when processing out-of-sample data (e.g., an upper out-of-sample bound may correspond to an out-of-sample error rate of at most 10% of the time the classifier outputting an incorrect output). In an example where the out-of-sample error bound corresponds to a PAC bound, the out-of-sample error bound may indicate a 95% certainty that the out-of-sample error rate is at most 15%. The out-of-sample error bound may be computed as various types of bounds, such as an upper bound, a lower bound, or both. If the classifier selected by the training procedure is not within the subset of classifiers, then a bound failure is reported to indicate that an out-of-sample bound could not be produced for this classifier.

If the out-of-sample error bound is within a tolerance threshold (e.g., 10% is within a 15% tolerance threshold for the classifier being incorrect when generating outputs for out-of-sample data), then the classifier may be utilized to classify out-of-sample data (e.g., classifying whether users visiting a website would watch a particular video). If the out-of-sample error bound exceeds the tolerance threshold (e.g., 10% exceeds a 6% tolerance threshold for the classifier being incorrect when generating outputs for out-of-sample data), then additional in-sample examples are obtained for training the set of classifiers.

Figure 5:
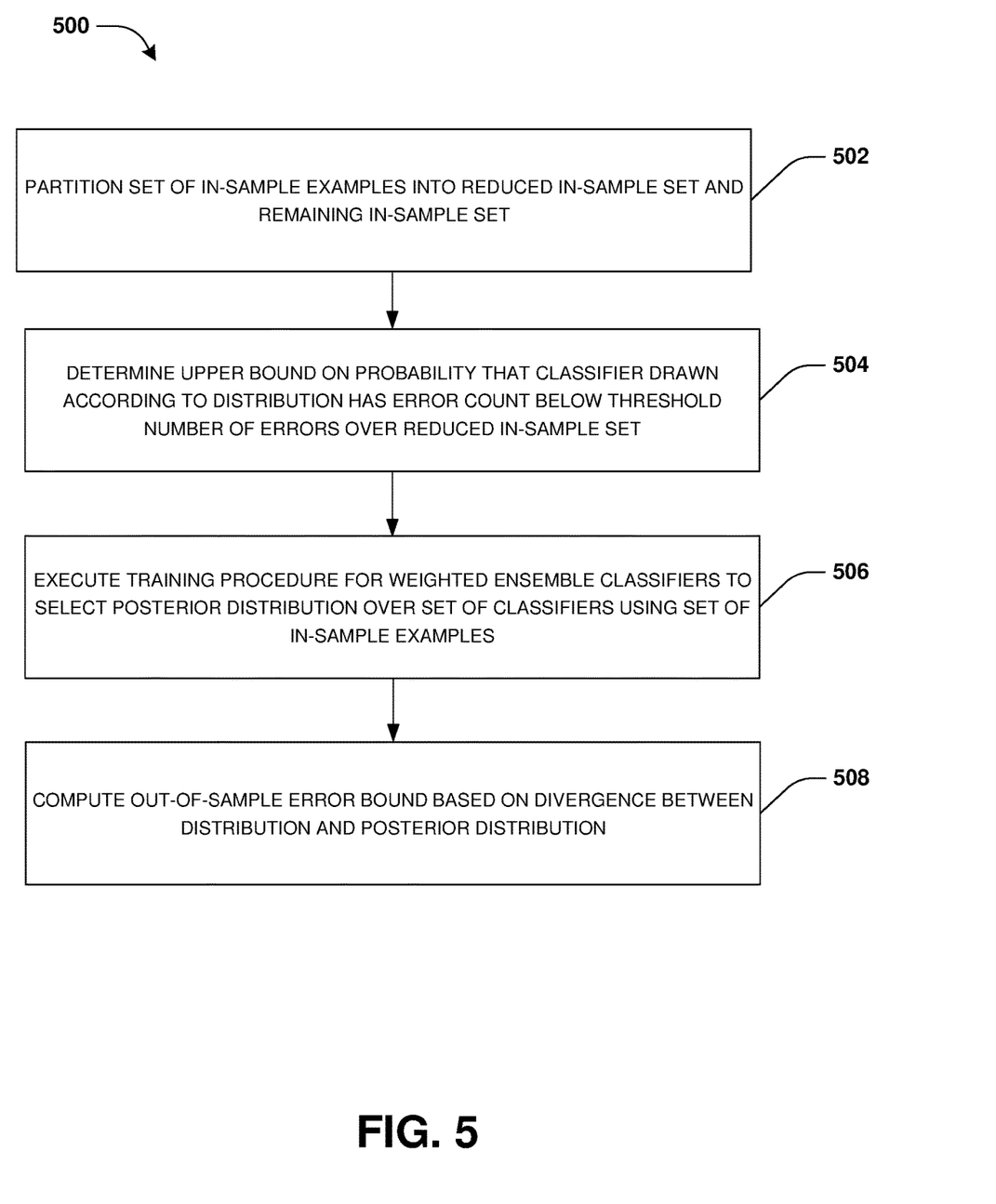
FIG. 5 is a flow chart illustrating an example method for classifier validation.

An embodiment of classifier validation is illustrated by an example method 500 of FIG. 5. A set of in-sample examples may be obtained for training and/or validating classifiers. In an example, n in-sample examples may be obtained as the set of in-sample examples. The set of in-sample examples may comprises input-output pairs. An input-output pair may specifying an input, such as an image or image features, and an output that is known to be a correct output for the input, such as whether the image depicts a balloon. A set of classifiers may be identified, such as where m classifiers are selected as a hypothesis set (H) of classifiers for training and validation.

At 502, the set of in-sample examples are partitioned into a reduced in-sample set of examples and a remaining in-sample set of examples. In an example, r in-sample examples are removed from the set of in-sample examples, thus creating a remaining in-sample set of n−r examples and a reduced in-sample set of r examples.

A threshold number of error counts may be defined. In an example, the threshold number of error counts may be defined as $k^*\_r$. Accordingly, a subset of classifiers (R) of the classifiers within the hypothesis set (H) that have k*_r or fewer errors over the reduced in-sample set of r examples may be defined. At 504, a determination is made as to an upper bound on a probability that a classifier drawn according to a distribution (e.g., a prior distribution) has an error count below the threshold number of errors over the reduce in-sample set of r examples (e.g., an error count less than k*_r).

At 506, a training procedure is executed during a classifier training phase. The training procedure is performed for weighted ensemble classifiers to select a posterior distribution over the set of classifiers using the set of in-sample examples.

At 508, an out-of-sample error bound is computed based upon a divergence between the distribution (e.g., the prior distribution) and the posterior distribution. In an example, the out-of-sample error bound is also computed by adding a natural logarithm of the upper bound as a shrinkage ratio to the divergence. The shrinkage ratio may correspond to the probability that the classifier drawn according to the distribution has the error count below the threshold number of errors over the reduced in-sample set of r examples. In an example, the out-of-sample error bound is also computed by utilizing the remaining in-sample set of n−r examples as in-sample examples for computing the out-of-sample error bound. In an example, the out-of-sample error bound is also computed by adding a fraction of the posterior distribution placed on classifiers that do not have error counts below the threshold number of errors to the out-of-sample error bound. In some embodiments, the out-of-sample error bound is computed based upon a Kullback-Leibler divergence. The out-of-sample error bound may be computed as various types of bounds, such as an upper bound, a lower bound, or both. In some embodiments, the out-of-sample error bound is computed as a PAC-Bayes out-of-sample error bound.

If the out-of-sample error bound is within a tolerance threshold (e.g., 10% is within a 13% tolerance threshold for the classifier being incorrect when generating outputs for out-of-sample data), then the classifier may be utilized to classify out-of-sample data (e.g., classify images as either depicting or not depicting balloons). If the out-of-sample error bound exceeds the tolerance threshold (e.g., 10% exceeds a 5% tolerance threshold for the classifier being incorrect when generating outputs for out-of-sample data), then additional in-sample examples are obtained for training the set of classifiers.

Figure 6:
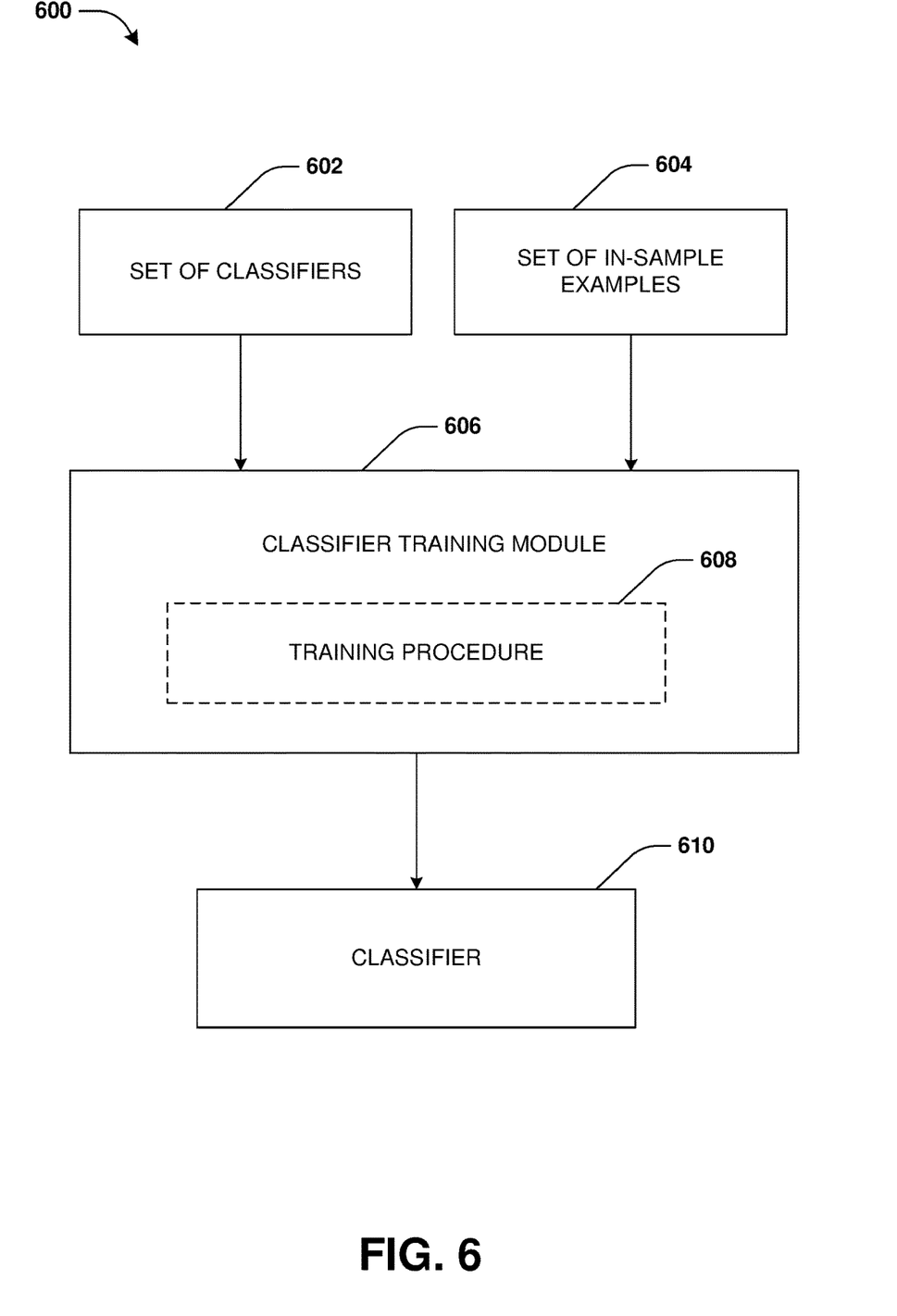
FIG. 6 is a component block diagram illustrating an example system for classifier validation, where a classifier is selected by a training procedure.
Figure 7:
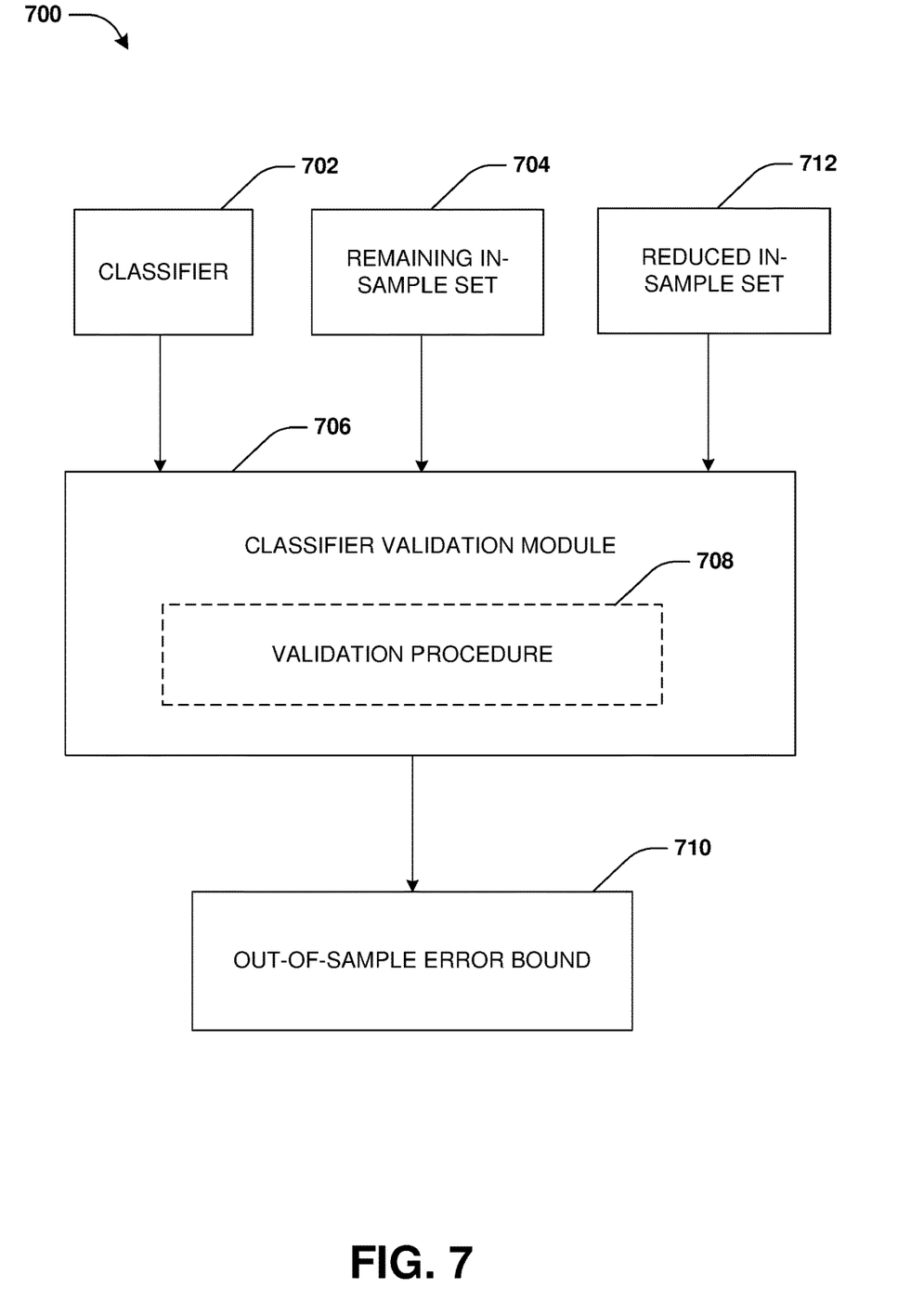
FIG. 7 is a component block diagram illustrating an example system for classifier validation, where a classifier is validated by a validation procedure.

FIG. 6 illustrates a system 600 for classifier training, while FIG. 7 illustrates a system 700 for classifier validation, which may implement the techniques described herein. A classifier training module 606 may obtain a set of in-sample examples 604 comprising input-output pairs of examples, as illustrated by FIG. 6. An input-output pair may specify an input, such as a document, and an output that is known to be a correct output for the input, such as a topic of the document (e.g., the document discusses dog grooming). The classifier training module 606 may decide on a set of classifiers 602 to train using the set of in-sample examples 604.

The classifier training module 606 executes a training procedure 608 to train the set of classifiers 602 using the set of in-sample examples 604. The training procedure 608 is executed by the classifier training module 606 to select a classifier 610 from the set of classifiers 602 based upon the classifier 610 having an error rate, over the set of in-sample examples 604, less than an error rate threshold (e.g., a minimum error rate in comparison with other classifiers within the set of classifiers 602 that are evaluated by the training procedure 608 using the set of in-sample examples 604). In this way, the classifier 610 is trained and selected by the classifier training module 606 from the set of classifiers 602 using the training procedure 608 and the set of in-sample examples 604.

A classifier validation module 706, of FIG. 7, is configured to validate a classifier 702, such as the classifier 610 selected by the classifier training module 606 using the training procedure 608. In particular, the classifier validation module 706 may partition a set of in-sample examples (e.g., the set of in-sample examples 604 used to train/select the classifier 610) into a reduced in-sample set of examples 712 and a remaining in-sample set of examples 704, which may be used by the classifier validation module 706 to validate the classifier 702 using a validation procedure 708.

The classifier validation module 706 executes the validation procedure 708 to determine an out-of-sample error bound 710 for the classifier 702. For example, the classifier validation module 706 executes a set of classifiers (e.g., the set of classifiers 602 from which the classifier 610/710 was selected) to process the reduced in-sample set of examples 712, and identifies a subset of classifiers having error counts below a threshold number of errors over the reduced in-sample set of examples 712. If the classifier 702 is within the subset of classifiers, then the classifier validation module 706 utilizes the validation procedure 708 to determine the out-of-sample error bound 710 for the classifier 702 based upon an error rate of the classifier 702 over the remaining in-sample set of examples 704, a count of remaining examples within the remaining in-sample set of examples 704, and/or a ratio of a selected upper bound for a probability of bound failure and a number of classifiers within the subset of classifiers.

In an example, a set of in-sample examples is partitioned into a reduced in-sample set and a remaining in-sample set. The set of in-sample examples may comprise input-output pairs, such as a first input-output pair, a second input-output pair, a third input-output pair, a fourth input-output pair, a fifth input-output pair, and/or other input-output pairs not depicted. An input-output pair of the set of in-sample examples may comprise an input, such as an image or features of an image. The input-output pair of the set of in-sample examples may comprise an output, such as a "yes" or "no" as to whether the image depicts a balloon. The set of in-sample examples may be used to train a set of classifiers.

In order to validate a classifier, the set of in-sample examples may be partitioned. The set of in-sample examples may be partitioned into a reduced set in-sample set of examples and/or a remaining in-sample set of examples. For example, the first input-output pair, the second input-output pair, the fifth input-output pair, and/or other input-output pairs may be partitioned from the set of in-sample examples into the reduced in-sample set of examples. The third input-output pair, the fourth input-output pair, and/or other input-output pairs may be partitioned from the set of in-sample examples into the remaining in-sample set of examples.

The remaining in-sample set of examples and/or the reduced in-sample set of examples may be used to validate a classifier. For example, a classifier validation module may utilize a validation procedure to determine an out-of-sample error bound for the classifier. In particular, the classifier validation module executes a set of classifiers to process the reduced in-sample set of examples, and identifies a subset of classifiers having error counts below a threshold number of errors over the reduced in-sample set of examples. If the classifier is within the subset of classifiers, then the classifier validation module utilizes the validation procedure to determine the out-of-sample error bound for the classifier based upon an error rate of the classifier over the remaining in-sample set of examples, a count of remaining examples within the remaining in-sample set of examples, and/or a ratio of a selected upper bound for a probability of bound failure and a number of classifiers within the subset of classifiers.

Figure 8:
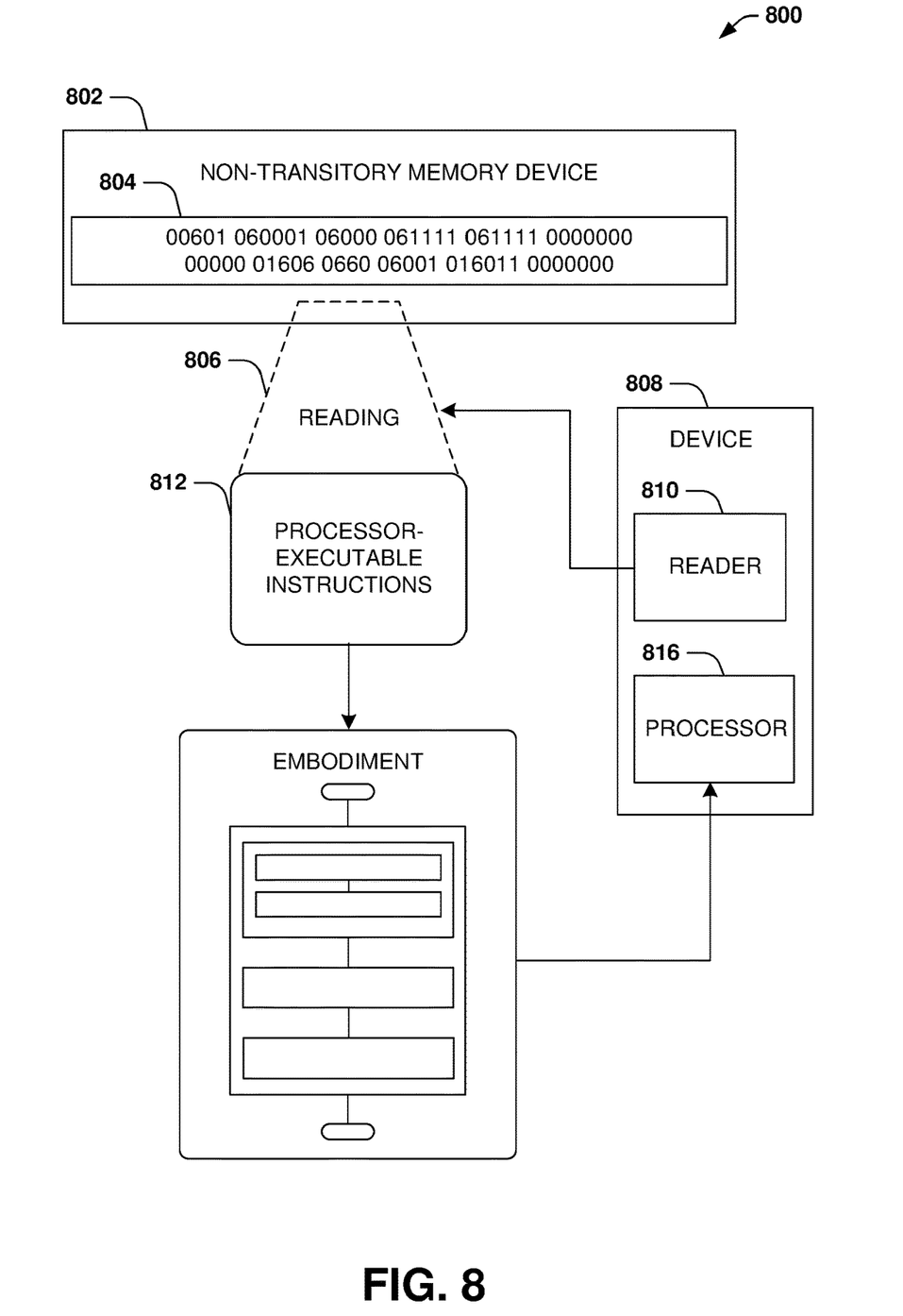
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 400 of FIG. 4 and/or at least some of the example method 500 of FIG. 5, for example. In some embodiments, the processor-executable instructions 812 are configured to cause implementation of a system, such as at least some of the example system 600 of FIG. 6 and/or at least some of the example system 700 of FIG. 7, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   executing, on a processor of a computing device, instructions that cause the computing device to perform operations, the operations comprising:
   partitioning a set of in-sample examples into a reduced in-sample set of examples and a remaining in-sample set of examples;
   processing the reduced in-sample set using a set of classifiers;

identifying a subset of classifiers of the set of classifiers as having error counts below a threshold number of errors over the reduced in-sample set;

executing a training procedure to select a classifier from the set of classifiers based upon the classifier having an error rate, over the set of in-sample examples, less than an error rate threshold; and upon the classifier being in the subset of classifiers, determining an out-of-sample error bound for the classifier based upon an error rate of the classifier over the remaining in-sample set.

2. The method of claim 1, wherein the determining the out-of-sample error bound comprises:

determining the out-of-sample error bound based upon a count of remaining examples within the remaining in-sample set.

3. The method of claim 1, wherein the determining the out-of-sample error bound comprises:

determining the out-of-sample error bound based upon a ratio of a selected upper bound for a probability of bound failure and a number of classifiers in the subset of classifiers.

4. The method of claim 1, comprising:

reporting a bound failure based upon the classifier not being in the subset of classifiers.

5. The method of claim 1, wherein the identifying a subset of classifiers comprises:

in response to the set of classifiers exceeding a threshold number of classifiers, sampling a portion of the set of classifiers as a set of sampled classifiers for identifying the subset of classifiers.

6. The method of claim 5, wherein the identifying a subset of classifiers comprises:

identifying a fraction of the set of sampled classifiers that have error counts below the threshold number of errors over the reduced in-sample set.

7. The method of claim 6, wherein the identifying a subset of classifiers comprises:

utilizing the fraction of the set of sampled classifiers to bound a rate at which classifiers in the set of classifiers have error counts below the threshold number of errors over the reduced in-sample set.

8. The method of claim 1, wherein the identifying a subset of classifiers comprises:

in response to the set of classifiers not exceeding a threshold number of classifiers, testing all classifiers within the set of classifiers for identifying classifiers having error counts below the threshold number of errors over the reduced in-sample set.

9. The method of claim 1, comprising:

in response to the out-of-sample error bound being within a tolerance threshold, utilizing the classifier to classify out-of-sample data.

10. The method of claim 1, comprising:

in response to the out-of-sample error bound exceeding a tolerance threshold, obtaining additional in-sample examples for training the set of classifiers.

11. A non-transitory machine readable medium having stored thereon processor-executable instructions that when executed cause performance of operations, the operations comprising:

partitioning a set of in-sample examples into a reduced in-sample set of examples and a remaining in-sample set of examples;

processing the reduced in-sample set using a set of classifiers;

identifying a subset of classifiers of the set of classifiers as having error counts below a threshold number of errors over the reduced in-sample set;

executing a training procedure to select a classifier from the set of classifiers based upon the classifier having a minimum error rate over the set of in-sample examples; and upon the classifier being in the subset of classifiers, determining an out-of-sample error bound for the classifier based upon an error rate of the classifier over the remaining in-sample set, a count of remaining examples within the remaining in-sample set, and a ratio of a selected upper bound for a probability of bound failure and a number of classifiers in the subset of classifiers.

12. The non-transitory machine readable medium of claim 11, wherein the operations comprise:

in response to the out-of-sample error bound being within a tolerance threshold, utilizing the classifier to classify out-of-sample data.

13. A computing device comprising:

a processor; and memory comprising processor-executable instructions that when executed by the processor cause performance of operations, the operations comprising:

partitioning a set of in-sample examples into a reduced in-sample set of examples and a remaining in-sample set of examples;

determining an upper bound on a probability that a classifier drawn according to a distribution has an error count below a threshold number of errors over the reduced in-sample set;

performing a training procedure for weighted ensemble classifiers to select a posterior distribution over a set of classifiers using the set of in-sample examples; and computing an out-of-sample error bound based upon a divergence between the distribution and the posterior distribution.

14. The computing device of claim 13, wherein the probability is a shrinkage ratio, and wherein the computing an out-of-sample error bound comprises:

adding a natural logarithm of the upper bound as the shrinkage ratio to the divergence.

15. The computing device of claim 13, wherein the computing an out-of-sample error bound comprises:

utilizing the remaining in-sample set as in-sample examples for computing the out-of-sample error bound.

16. The computing device of claim 13, wherein the computing an out-of-sample error bound comprises:

adding a fraction of the posterior distribution placed on classifiers that do not have error counts below the threshold number of errors over the reduced in-sample set to the out-of-sample error bound.

17. The computing device of claim 13, wherein the out-of-sample error bound is a PAC-Bayes out-of-sample error bound.

18. The computing device of claim 13, wherein the out-of-sample error bound is based upon a Kullback-Leibler divergence.

19. The computing device of claim 13, wherein the operations comprise:

upon a bound being within an acceptance threshold, utilizing the classifier on out-of-sample data.

20. The computing device of claim 13, wherein the operations comprise:

upon a bound not being within an acceptance threshold, obtaining additional in-sample data.

* * * * *